United States Patent [19]
Martinek et al.

[11] Patent Number: 5,567,457
[45] Date of Patent: Oct. 22, 1996

[54] METHOD FOR TREATING FEED GRAINS

[75] Inventors: Donnie R. Martinek, Gunter; Clinton D. Shelton, McKinney; John S. Kemp, Prosper, all of Tex.

[73] Assignee: McKinney Grain, Inc., McKinney, Tex.

[21] Appl. No.: 323,812

[22] Filed: Oct. 17, 1994

[51] Int. Cl.⁶ .............................. A23K 1/00; A23L 1/00; A23L 1/10
[52] U.S. Cl. .................. 426/233; 426/623; 426/532; 426/468; 34/92; 99/355; 99/395
[58] Field of Search .................... 426/233, 623, 426/532, 468; 34/92; 99/355, 395

[56] References Cited

U.S. PATENT DOCUMENTS

| | | | |
|---|---|---|---|
| 3,615,653 | 10/1971 | Fults | 99/8 |
| 3,751,267 | 8/1973 | Sachnik | 99/81 |
| 3,796,807 | 3/1974 | Whelan | 426/468 |
| 3,958,015 | 5/1976 | Gay | 426/18 |
| 4,085,520 | 4/1978 | Lambert, Jr. | 34/79 |
| 4,089,259 | 5/1978 | Stickle et al. | 99/355 |
| 4,254,150 | 3/1981 | Fritze et al. | 426/18 |

*Primary Examiner*—Donald E. Czaja
*Assistant Examiner*—Choon P. Koh
*Attorney, Agent, or Firm*—Jerry C. Ray

[57] ABSTRACT

An improved process for treating grain used for animal feeds includes steps of conditioning the grain to soften the grain coats, quickly heating the grain to a temperature just below a temperature sufficient to cause the grains to burst, compressing the heated grain between rollers to cause the grain to burst, further pressing the burst grains into flakes, and cooling the flaked grain. During the cooling step water is added to bring the moisture content of the final product to a desired level; digestibility enzymes and other additives are added with the water.

6 Claims, 2 Drawing Sheets

METHOD FOR TREATING FEED GRAINS

CROSS-REFERENCE TO RELATED APPLICATIONS

None; Applicant has filed, however, Disclosure Document No. 35 1478, dated Apr. 14, 1994, which is related to this invention; it is therefore requested by separate letter that this document be retained and acknowledgement thereof made by Examiner.

BACKGROUND OF THE INVENTION

1. Field of the Invention

This invention is related to methods and apparatus for processing grains, and especially to methods for processing grain to improve its palatability and its digestibility when used for livestock feed.

2. Description of the Related Art

The problem addressed by the present invention is that of making feed grains more palatable and digestible by animals, especially dairy cattle. Dairy cattle feeds have specific nutritional requirements which may be more easily met by proper treating of grains before their use as feed. Such treating should be energy efficient with low labor costs, and generally economical so as not to unduly increase the cost of the feed product.

Several patents have issued in the United States for treating and processing grains, both for human and animal consumption. An early patent was to Kellogg, whose process included boiling or steaming, flaking, steaming again, and baking or roasting. Gurjar discloses a method for making a rice cereal for human consumption, and Luft discloses another process for human consumption which depends on the absorption of moisture by the grains before they are flattened by rolling. Lai discloses a method in which the grain is first parboiled, then rolled and toasted. Whelan ('807) discloses a method in which grain is heated and then rolled, and Whelan ('475) discloses a method requiring the grain to first be cut into fragments.

Including the above-mentioned patents, Applicant is aware of the following U.S. Pat. Nos.:

| U.S. Pat. No. | Patentee | Issue Date |
| --- | --- | --- |
| 558,393 | Kellogg | Apr. 14, 1896 |
| 1,377,125 | Guflar | May 03, 1921 |
| 1,424,927 | Luft | Aug. 08, 1922 |
| 3,796,807 | Whelan | Mar. 12, 1974 |
| 4,080,475 | Whelan | Mar. 21, 1978 |
| 5,183,682 | Lai | Feb. 02, 1993 |

SUMMARY OF THE INVENTION

Progressive Contribution to the Art

The invention is a process and related apparatus to improve the palatability and digestibility of grains used for animal feed. In the first step, grain seed coats are softened by a water-soluble conditioning agent, after which the grain is heated and then flaked by passage through a roller mill. Flaking is made more efficient by the internal pressure in the grains generated by heating, so that the grains burst during rolling. The roaster uses economical natural gas to heat the grain quickly. An airlock with internal rotating baffles moves the grain between roaster and roller mill, so that an exhaust blast from the roaster is blocked from entering the roller and scattering grain. Small grain particles are reclaimed from the exhaust of both roaster and cooler.

Objects of this Invention

It is an object of this invention to provide a method of processing grain for livestock feed which will have improved palatability and digestibility.

It is another object to provide a method of processing grain for livestock feed which will have relatively low energy costs and low labor costs.

It is a further object of this invention to accomplish the above with equipment which is generally available, and which may be modified and adapted to the invention.

Further objects are to achieve the above with devices that are sturdy, simple, safe, efficient, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

CATALOG OF THE ELEMENTS

Figure 1:
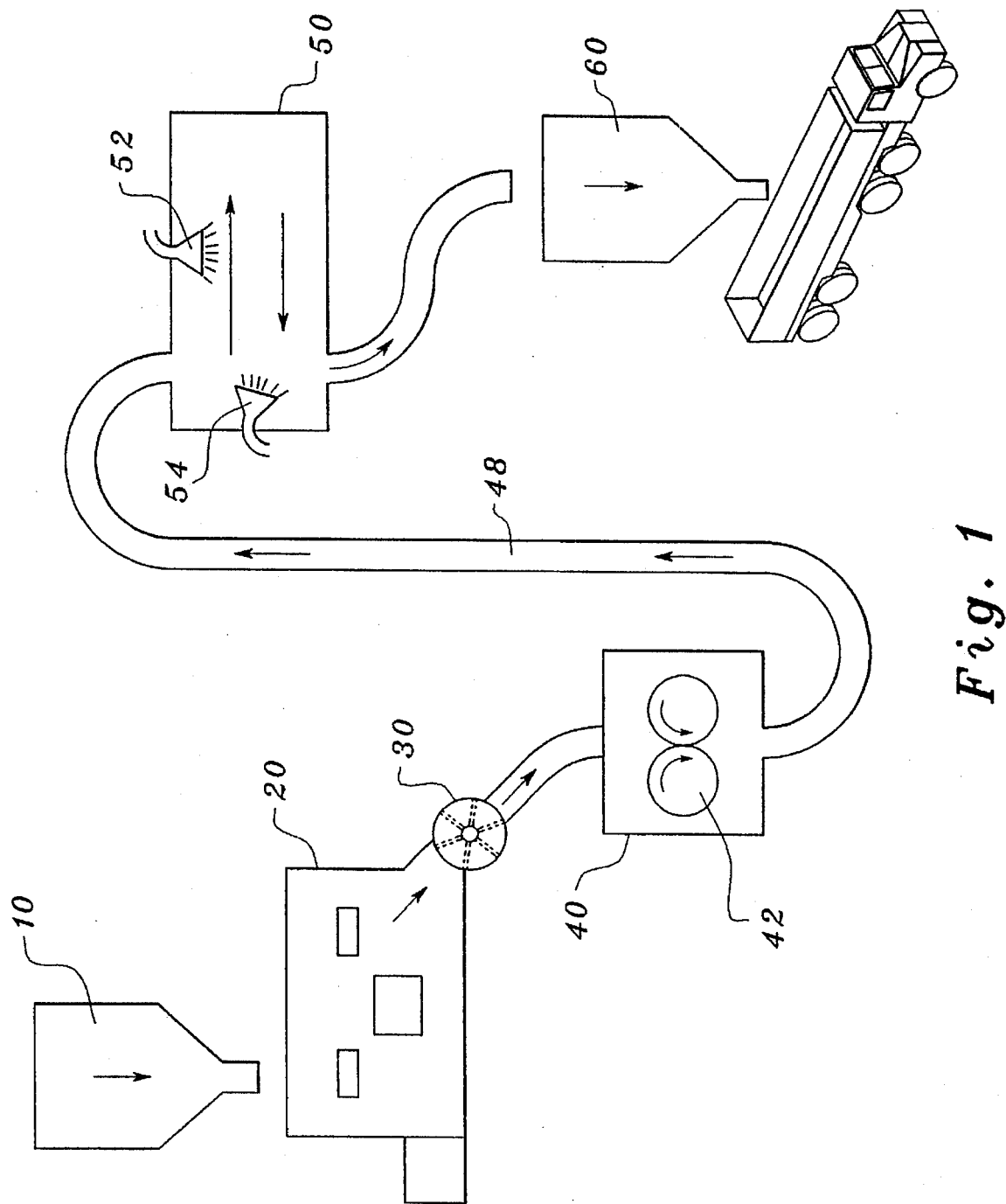
FIG. 1 is a schematic illustration of the components used in the grain-treating process.
Figure 2:
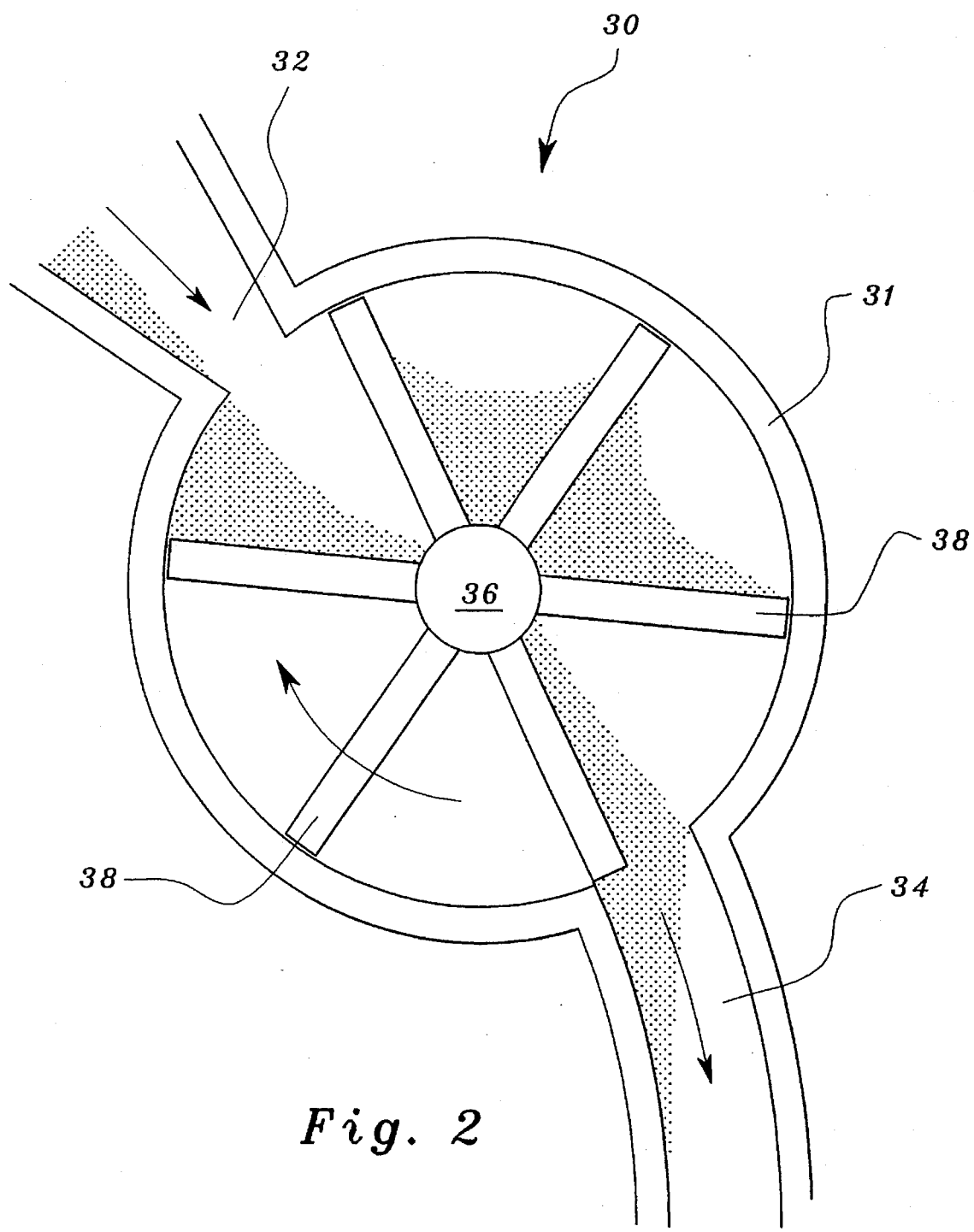
FIG. 2 illustrates the airlock between the grain roaster and the roller mill.

As an aid to correlating the terms in the description to the exemplary drawings, the following catalog of elements is provided:

10—conditioning hopper
20—roaster
30—air lock
31—cylindrical wall
32—air lock inlet
34—air lock outlet
36—axial shaft
38—longitudinal baffle
40—roller mill
42—roller
48—drag conveyor
50—cooler
52—water spray bar
54—enzyme spray bar
60—distribution hopper

DESCRIPTION OF THE PREFERRED EMBODIMENTS

This description refers primarily to milo, a grain sorghum, but also applies to other grains such as wheat, corn, oats, etc. As used herein, kernel means an individual grain.

In the first step, bulk grain is conditioned by wetting with a solution of propionic acid in water; this is a penetrating solution which acts to soften the grain coats. The propionic acid is mixed with sufficient water to achieve the desired rates of application per ton of grain. Enough solution is applied to thoroughly wet the grain, with any excess solution allowed to drain off. A typical rate of application of the conditioning agent, for milo, is 6–8 oz. per ton. A commercially available solution is sold under the name "E-Z Flake" by Loveland Industries, a Colorado company.

After the conditioning solution is applied, sufficient time is allowed to pass for the conditioner to soften the grain coat; during this period the grain is held in conditioning hopper 10. The length of time to achieve a proper weakening of the grain coat varies considerably. A typical period for softening for milo is 6–24 hours, with an optimum range being 10–18 hours. Softening the grain coat makes the remaining steps in the process easier and more energy efficient.

The next step is heating the grain in roaster 20; a gas-fired roaster is preferred. A Jet Pro Model 10 roaster is used in the prototype, but other types of roasters are equally useful. During heating, internal moisture inside grain kernels is converted to steam. If the heating is carried to a sufficiently high temperature, the kernels will pop like popcorn. A feature of the present invention is to heat the grain to a temperature just below a temperature which will make the kernels pop—this temperature is important during the rolling step, as described below. The appropriate temperature for each grain type is based on empirical dam. Temperature of the grain is monitored by measuring the temperature of the atmosphere inside the roaster 20. For milo, the temperature is about 310° F., and the residence time of the grain inside the roaster is about 70 seconds.

Small grain particles called fines may be separated from the grain and exhausted from the roaster with the hot exhaust air flow. The air flow passes through a centrifugal, cone-shaped separator, which separates the particulate matter from the air stream. The particulate fines are then introduced into the roller mill 40 to be reincorporated into the product. A similar procedure for recapturing fine particulate material is used for the exhaust air from the cooler, described below.

When the grain has been heated to the proper temperature, i.e., to a temperature just below that which will cause the individual kernels to burst, the grain must be quickly moved to the roller mill 40. It is necessary to perform this transfer quickly so that the grain will not cool appreciably, because the effectiveness of the crushing step is dependent on grain temperature.

An airlock 30 provides the passage between roaster 20 and roller mill 40; the airlock construction is necessary because the roaster is under a positive pressure relative to ambient atmospheric pressure, and the airlock prevents exhaust air from the roaster from scattering the heated grain. The airlock 30 comprises a cylindrical chamber having a wall 31 with an inlet 32 through which grain enters from the roaster, and an outlet 34 to the roller mill. Inlet 32 and outlet 34 are openings in the cylindrical wall 31 which are slots or some other shape.

An axial rotatable shaft 36 extends the length of the airlock cylinder, and is rotated by external means such as an electric motor. In the preferred embodiment, the airlock shaft is driven by a reduction gear which is turned by a variable-speed electric motor, so that the rotational speed of the shaft can be adjusted to accommodate different rates of grain flow. Attached to the axial shaft are three or more longitudinal baffles 38 which extend the length of the airlock cylinder. The baffles 38 are sized to fit closely against the inner surface of the airlock cylindrical wall 31 so as to block the heated air from blowing into the roller mill from the roaster. A series of compartments inside the airlock are defined by the baffles 38. As the baffles rotate, grain moves into one compartment from the roaster via inlet 32, is moved around an inner circumference of the airlock until adjacent the airlock exit; the grain then flows into the roller mill 40 for crushing via outlet 34. Because both time and distance between roaster and roller mill are short, the grain enters the roller mill at substantially the same temperature at which it left the roaster.

Vaporization of moisture inside individual kernels of heated grain produces internal pressure in the grains. The pressure is a function of the temperature of the grain and the length of time the grain has been heated. Both these factors, temperature and heating time, are controlled so that the pressure inside the grains is just below the bursting pressure of the grains. When this pressure is exceeded, the grains burst like popcorn.

As the kernels pass between the rollers 42 of roller mill 40, the mechanical pressure of the rollers, added to the existing pressure inside the kernels, causes the kernels to burst. On completing its pass between the rollers, the expanded, less-dense grains are pressed into flakes. Generally the rollers 42 are set at a spacing of about 1/32 inch, and the resulting flakes are about the same thickness. Corn requires a slightly wider roller spacing. The prototype of the invention uses a Ferrell-Ross flaking mill; other flaking and roller mills are also useful.

The flakes are scraped from the rollers and moved via a drag conveyor 48 to a cooler 50, in which a stream of air is used to cool the flaked grain. Currently, a Sprout-Waldron double pass cooler is used, in which the grain makes two passes through the cooler 50. At the end of the first pass, in the upper part of the cooler, a spray of water is applied via water spray-bar 52 to the still-warm flaked grain. The addition of water is to return the final product to a moisture content similar to that of unprocessed grain, or to a moisture content suitable for the intended use of the flaked grain. The optimum moisture content is predetermined, and is typically about 14%. Testing with moisture meters before and after processing allow the necessary amount of added water to be determined. During the second pass of the flaked grain through the cooler 50, enzyme spray bar 54 applies a spray of enzyme solution to the grain. The enzyme increases the digestibility of the grain in the stomachs of ruminants, and is commercially available as "Digest-M" (for milo) and "Digest-C" (for corn) from Loveland Industries.

As with the exhaust from the roaster, the exhaust from the grain cooler is filtered to capture fines blown off the grain. The fines are reintroduced into the final product to eliminate waste. After its final pass through the cooler 50, the flaked, treated grain is moved to a distribution hopper 60. From distribution hopper 60 the grain product is loaded into trucks or other means of transportation. Where the grain is not shipped in bulk, it may be moved to another area of the mill for bagging.

The embodiments shown and described above are only exemplary. I do not claim to have invented all the pans, elements, or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

We claim as our invention:

1. An improved process for increasing the palatability and digestibility of grains used for animal feeds by
   a) wetting grain with a conditioning agent to soften grain coats,
   b) allowing sufficient time for grain coats to soften,
   c) heating conditioned grain, then
   d) flaking heated conditioned grain,
   wherein the improvement comprises:
   e) passing said heated conditioned grain through an air lock from a roaster to a means for rolling the grain, said airlock having rotating baffles therein to prevent grain being scattered by an air discharge from the roaster,
   f) moving heated conditioned grain from an airlock inlet to an airlock outlet exit by motion of said rotating baffles,
   g) compressing mechanically the heated conditioned grain to a pressure sufficient in combination with an internal pressure of heated kernels to cause heated kernels to burst,
   h) further compressing burst kernels into flaked grain, and
   j) cooling the flaked grain.

2. The invention as described in claim 1, wherein the passing step further comprises:
   k) passing said heated conditioned grain from the roaster to a means for rolling the grain responsive to the grain inside the roaster reaching a predetermined temperature.

3. The invention as described in claim 2, wherein:
   l) said predetermined temperature for milo is about 310° F., and
   m) a residence time for grain inside the roaster is about 70 seconds.

4. The invention as described in claim 1, wherein said compressing step further comprises:
   n) compressing heated conditioned grain between rollers of a roller mill.

5. The invention as described in claim 1, wherein said pressing step further comprises:
   p) pressing said burst kernels into flakes between rollers of a roller mill.

6. The invention as described in claim 1, wherein said cooling step further comprises:
   q) conveying grain through a two-pass cooler,
   r) applying water to the flaked grain after a first pass to increase the moisture content of the final product to a predetermined amount.

* * * * *